US005765374A

United States Patent [19]

Hansen

[11] Patent Number: 5,765,374

[45] Date of Patent: Jun. 16, 1998

[54] GAS DRIVEN MECHANICAL OSCILLATOR AND METHOD

[75] Inventor: Anthony Maurice Hansen, Toowong, Australia

[73] Assignee: Linear Energy Corporation Limited, Bundall, Australia

[21] Appl. No.: 596,114

[22] PCT Filed: May 29, 1995

[86] PCT No.: PCT/AU95/00317

§ 371 Date: Mar. 5, 1996

§ 102(e) Date: Mar. 5, 1996

[87] PCT Pub. No.: WO95/33125

PCT Pub. Date: Dec. 7, 1995

[30] Foreign Application Priority Data

May 31, 1994 [AU] Australia ................................ PM5970

[51] Int. Cl.[6] .......................................... F16D 31/02

[52] U.S. Cl. ................................ 60/373; 91/248; 91/249; 91/277

[58] Field of Search .............................. 91/248, 249, 277, 91/325, 330; 60/373

[56] References Cited

U.S. PATENT DOCUMENTS 3,185,040 5/1965 Ligon ........................................ 91/277

3,782,246 1/1974 Hilbrands .................................. 91/277

4,016,941 4/1977 Sanders .................................... 91/277

*Primary Examiner*—F. Daniel Lopez

*Attorney, Agent, or Firm*—Young & Thompson

[57] ABSTRACT

A gas driven oscillator (10) comprising an engine (11) having a cylinder (12) and a pair of expansion chambers (13, 14) on either side of a floating piston (15) adapted to reciprocate within the cylinder (12). The piston (15) is mounted on a piston rod (16) extending through the cylinder (12) and into a compressor (17). Compressed air is delivered from a tank (20) to the engine (11) via a pair of valves (22, 23) mounted on an adjustment screw and slidably disposed on the piston rod (16). The spacing between the valves (22, 23) can be adjusted in order to vary the amplitude of the piston (15) within the cylinder (12). The piston rod (16) includes spaced slots (24, 25) which alternate align with passages inside the respective valves (22, 23) to deliver a pulse of compressed air to the respective chambers (13, 14) of the cylinder (12). Mercury is added to or discharged from a tank (42) which is rigidly secured to piston rod (16) to vary the inertia of the oscillator (10).

7 Claims, 5 Drawing Sheets

GAS DRIVEN MECHANICAL OSCILLATOR AND METHOD

TECHNICAL FIELD OF THE INVENTION

THIS INVENTION relates to a gas driven mechanical oscillator and method for converting the energy of an expanding gas into mechanical work using the oscillator and in particular, but not limited to, a gas driven dynamic linear oscillator using an oscillating mass to accelerate a heavier load against an air cushion.

BACKGROUND ART

Many engines utilise and operate on the principal whereby the energy of an expanding gas during a combustion process is used to produce mechanical work typically driving a piston. This process is utilised in an internal combustion engine.

The present invention has been devised to offer a useful alternative to present gas driven mechanical oscillators of this general kind by utilising physical principals in a different way to the customarily accepted techniques and methods for converting the energy of an expanding gas into mechanical work.

SUMMARY OF THE INVENTION

In one aspect the present invention resides in a method for converting the energy of an expanding gas into mechanical work comprising the steps of:

(i) applying a sequence of pulses of gas under a positive pressure to complementary expansion chambers of a variable amplitude mechanical oscillator to cause an oscillating member thereof to oscillate in order for the expanding gas to perform work under load;

(ii) continuing to apply said pulses to said chambers while progressively increasing the amplitude of oscillation of said oscillating member until a desired amplitude is reached; and (iii) continuing to apply said pulses to said chambers while maintaining said desired amplitude The method typically includes the further step of progressively increasing the inertia of said oscillating member while continuing to apply aid pulses to said chambers.

The method typically further includes the step of using the said oscillating member to directly or indirectly drive a compressor to compress gas.

In a further and alternative method step said oscillating member is used to directly or indirectly generate electricity.

In a further and alternative step said oscillating member is directly or indirectly used to liquefy air.

In a further and alternative step said oscillating member is used to directly or indirectly drive a combined compressor and electricty generator.

In a further aspect there is provided a gas driven mechanical oscillator comprising a casing, a plurality of expansion chambers within the casing, an oscillating member including moveable walls of said chambers, the oscillating member being adapted to oscillate in response to complementary expansion of gas within and exhaustion of gas from the chambers and there being provided control means operable to vary the amplitude of said oscillating member from an initial low amplitude to a higher amplitude.

Typically the control means comprises variable inertia means for increasing the inertia of said oscillating member during oscillation thereof. In another form where gas is delivered to the chambers as a sequence of gas pulses said control means preferably includes valve means to control the sequencing of said pulses delivered to the chambers in order to increase the amplitude.

In a particularly preferred form the expansion chambers are respective opposed chambers of a double acting pneumatic cylinder assembly having a cylinder and piston within the cylinder, the oscillating member including said piston and being provided with a reciprocable load mounted externally of said cylinder assembly, said piston and said load being mounted for movement together and preferably on a common elongate piston rod, said piston rod having spaced transverse slots and axially shiftable and positionable valve means movable along said piston rod, said valve means having passage means communicating with a source of compressed gas and at the same time with said chambers, said slots being alternately aligned with the respective spaced passages in said valve means to supply pulses of gas to the expansion chambers of the double acting pneumatic cylinder assembly to cause the oscillating member to oscillate.

In a still further aspect there is provided an AC power supply comprising a double acting pneumatic cylinder assembly including a cylinder and a piston assembly comprising a piston and piston rod attached thereto mounted for reciprocation with the cylinder, a source of compressed air, valve means alternately delivering compressed air from the source of compressed air either side of the piston to cause the piston to reciprocate within the cylinder, the piston rod being coupled to the piston and protruding from the cylinder, the piston rod carrying AC power generator driven by reciprocation of the piston.

In a further aspect there is provided a compressor comprising a double acting pneumatic cylinder assembly including a cylinder and a piston assembly comprising a piston and piston rod attached thereto mounted for reciprocation within the cylinder, a source of compressed air, valve means alternately delivering compressed air from the source of compressed air either side of the piston to cause the piston to reciprocate within the cylinder, the piston rod being coupled to the piston and protruding from the cylinder, the piston rod carrying variable inertia means for increasing the inertia of the moving piston assembly and an air compressor driven by reciprocation of the piston.

BACKGROUND OF THE INVENTION

In order that the present invention can be more readily understood and be put into practical effect reference will now be made to the accompanying drawings which illustrate preferred embodiments of the invention including specific applications and wherein.

DETAILED DESCRIPTION OF THE INVENTION

Figure 1:
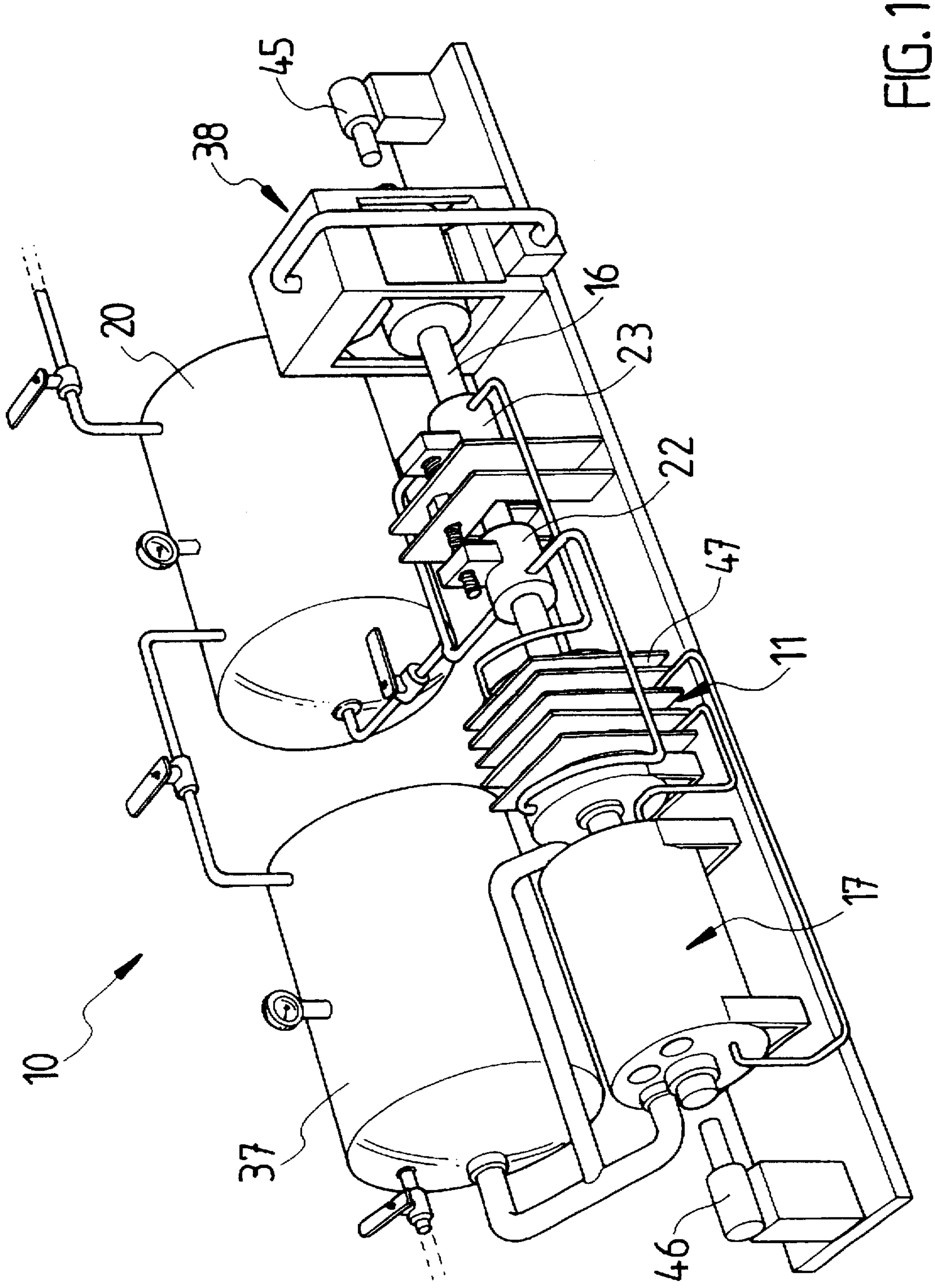
FIG. 1 is a perspective view illustrating a gas driven mechanical oscillator according to a preferred embodiment of the present invention.
Figure 2:
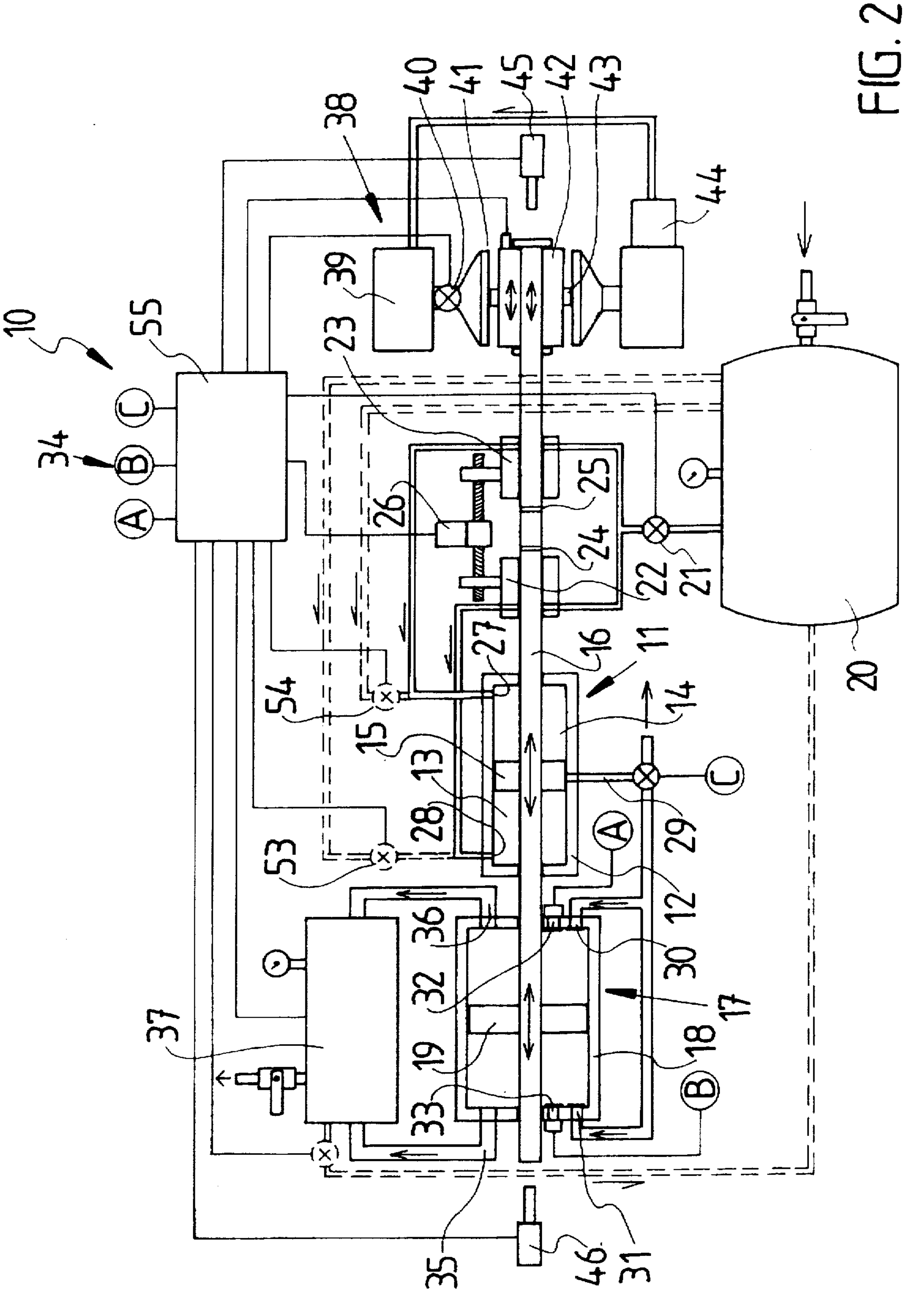
FIG. 2 is a sectional schematic view of the oscillator of FIG. 1 showing both mechanical and electrical control options.

Referring to the drawings and initially to FIG. 1 there is illustrated a gas driven oscillator 10 made according to the teachings of the present invention. Referring also to FIG. 2 there is illustrated in schematic section the gas driven oscillator 10 of FIG. 1. The oscillator illustrated in FIG. 1 is a completely mechanical system whereas the oscillator illustrated in FIG. 2 also shows the option of full electronic control. The main mechanical operating parts of the two Figures is the same in each case.

The following description will refer to FIGS. 1 and 2, it being understood that the oscillator can be optionally controlled either mechanically or electrically. In addition the dimensions of the components will vary according to capacity.

The gas driven oscillator 10 employs as its main part an engine 11 having a casing 12 and a pair of expansion chambers 13 and 14 on either side of a floating piston 15 adapted to reciprocate within the cylinder 12. The piston is mounted on a piston rod 16 extending through the cylinder 12 and into a compressor 17, the compressor 17 having a cylinder 18 and a piston 19 mounted on the piston rod 16 to move in concert with the piston 15. An air storage tank 20 holds compressed air typically at a pressure between 100 psi to 300 psi. The compressed air in tank 20 can be generated using a compressor located upstream. The upstream compressor can be driven by any suitable means including electric motor, internal combustion engine, windmill or the like. A valve 21 downstream of the tank 20 controls delivery of the compressed air from the tank 20 to the engine 11 via a pair of valves 22 and 23 with the valves 22 and 23 being mounted on an adjustment screw and slidably disposed on the piston rod 16. The spacing between the valves 22 and 23 can be adjusted in order to vary the amplitude of the piston 15 within the cylinder 12. The valves can be moved in opposite directions and an equal amount. The piston rod 16 includes spaced slots 24 and 25 which alternately align with passages inside the respective valves 22 and 23 to deliver a pulse of compressed air from the tank 20 to the respective chambers of the cylinder 12 at each movement of alignment. The piston 15 oscillates according to an amplitude set by the spacing between the valves 22 and 23. The valves 22 and 23 are mounted on the adjuster screw 26 so they can be moved together or apart as desired.

In the illustrated embodiment the cylinder 12 includes two intakes 27 and 28 and an exhaust outlet 29. As the pulse of compressed air enters an expansion chamber and moves the piston the gas expands and cools and then the cool expanded gas leaves through the exhaust outlet at 29 and flows through to respective intakes of the compressor 17.

The compressor 17 has intakes 30 and 31 from the engine 11 but also has intakes 32 and 33 drawing air from the atmosphere through non-return valves. The non-return valves are also employed at the other inlets so that there is positive displacement of air through outlets 35 and 36 during each stroke in order to compress air in the storage tank 37.

In the embodiment of FIGS. 1 and 2 a variable inertia means 38 is employed and this comprises a mercury storage tank 39, a valve 40 and a mercury delivery chute 41 communicating with a tank 42. The tank 42 is rigidly secured to the piston rod 16 and adapted to oscillate therewith. A second valve 43 is employed to discharge mercury from the tank 42 into a pump 44 which then returns the mercury to the storage tank 39. It will be appreciated that by adding mercury to the tank 42 the inertia of the oscillating portion of the system including the piston rods 16 and pistons 15 and 19 can be increased in order to overcome the gradual increase in pressure within the tank 37. The system will continue to operate in order to generate higher pressures whereupon gas can be bled from tank 37 or the intake valves to the compressor 17 can be closed. This provides a constant pressure air cushion for the piston 19 and the oscillator reciprocates at a constant amplitude and frequency.

During normal operation at start up it is usual to use air cylinders 45 and 46 to initially position the piston rod 16 so that one of the slots 24 or 25 are aligned with its associated passage in the respective valves 22 or 23. This can be accomplished manually. The valves 22 and 23 are close together for low amplitude operation. Valve 21 is then opened. Once valve 21 is open a pulse of compressed air will enter the appropriate chamber of the engine 11 and the system will commence to oscillate as long as the valves 22 and 23 are close enough together. This of course will be an oscillation of relatively short amplitude but as a consequence of the same pulse of air being delivered at each end of the piston stroke the oscillator 15 will operate as a forced oscillator and as a consequence the piston rod 16 will be capable of moving further than the distance between the valves on each stroke. As the amplitude is capable of increasing a small amount on each stroke the valves 22 and 23 are progressively moved apart in order to progressively increase the amplitude of oscillation of the piston 15 thus displacing more air in the compressor 17.

As the piston 15 moves back and forth within the cylinder 12 the piston 19 of the compressor 17 will also move back and forth pressurising the air within the tank 37 and gradually that pressure will increase. This increases the pressure to which the piston 19 must compress the air before it is admitted to the storage tank 37. Consequently, the force on the piston 19 tending to return it towards the middle of the compressor is increased. Thus the piston rod 16 and pistons 15 and 19 are oscillating with what are in effect air springs with increasing effective stiffness, tending to raise the natural frequency of the system in a manner analogous to the equation governing simple harmonic motion:

$$f \propto \sqrt{\frac{k}{m}}$$

where f is the frequency, k is the spring stiffness and m is the mass of the oscillator. The natural frequency of oscillation of the illustrated embodiment can be controlled by altering the ratio of the effective air spring stiffness and the combined mass of the piston rod 16 and the pistons 15 and 19. This control may be desirable to optimized the performance of the engine-compressor combination. It can be achieved by opening valve 40 to gradually deliver mercury into the system to increase its mass. An alternative to this is to bleed gas from the tank 37 or stop gas flowing into the compressor 17 to reduce the effective air spring stiffness.

As the air entering the cylinder 12 is a small pulse of compressed air from the tank 20 entering a relatively large chamber, that air entering the chamber will expand and cool. For this reason the engine 11 is provided with heat transfer vanes 47 to improve heat transfer as the engine 11 sinks heat from the atmosphere. This improves the efficiency of the system.

As can be seen in FIG. 1 the valves 22 and 23 can be moved apart or close together utilising rotation of the adjustment nut 26. A stepping motor is used for this purpose in the FIG. 2 embodiment.

As the valves 22 and 23 are moveable on the piston rod 16 the hoses connecting the valves to the engine 11 and to the tank 20 are preferably flexible metallic hoses.

Figure 3:
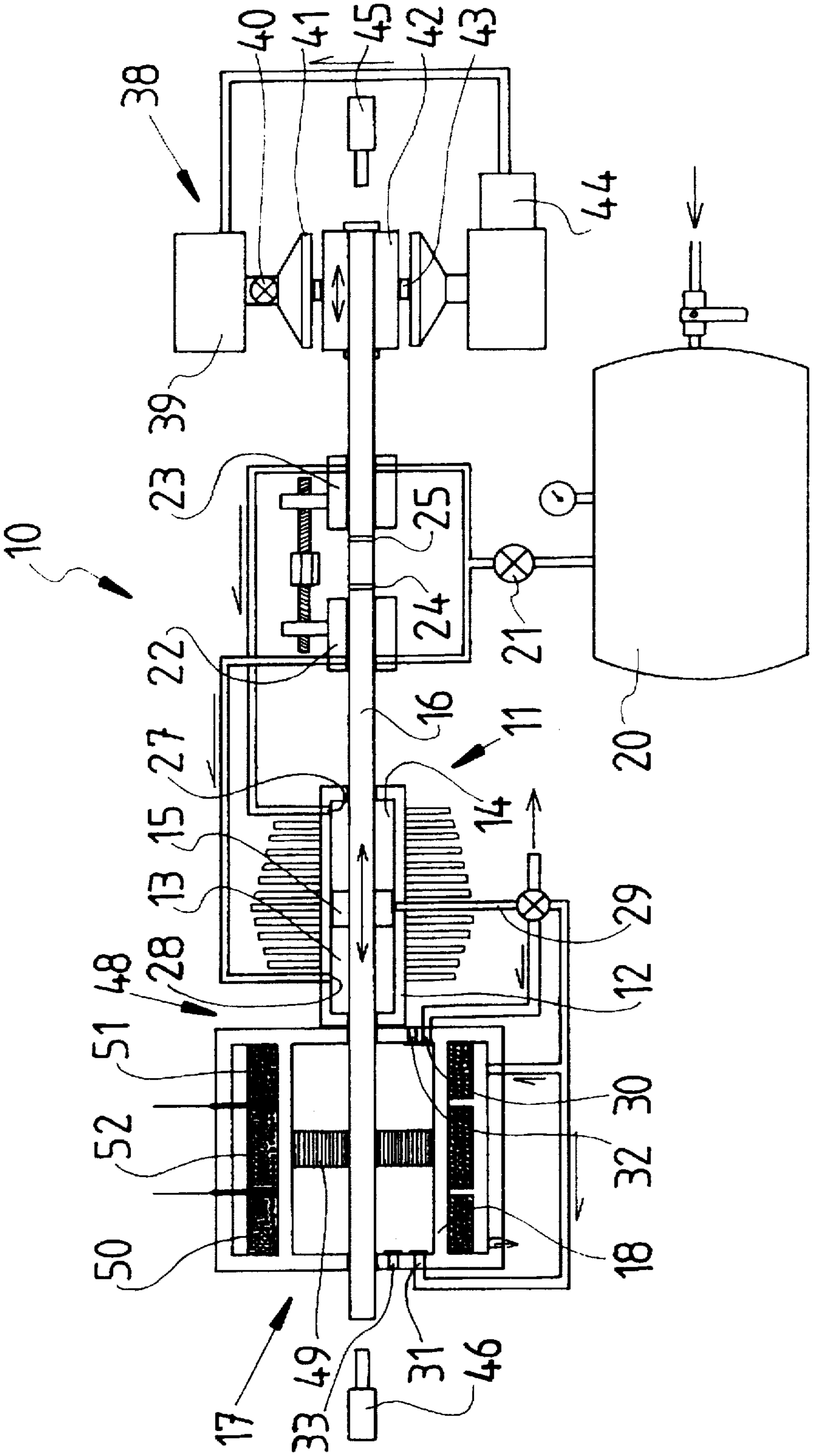
FIG. 3 is a sectional schematic of a further embodiment illustrating application of the present invention to an AC power generator.

Referring now to FIG. 3 there is illustrated a second embodiment of the present invention and where appropriate like numerals have been used to illustrate like features. In this case the main change is in the nature of the load. In FIG. 1 and 2 the load is the compressor 17 whereas in FIG. 3 the load is in the form of a generator 48 employing an armature 49. In this case the armature 49 is also a piston and the load can be configured as a generator and a compressor. The armature 49 is of known configuration moving in the field of respective DC exciter coils 50 and 51 with an AC output coil at 52 therebetween in order to generate AC power. In a typical example 240 volts at fifty cycles per second is generated.

Thus in the embodiment of FIG. 3 the present invention can be utilised as an AC power supply for use as a frequency stable power supply for a computer system.

As illustrated in FIG. 2 the present invention can be controlled electrically or mechanically. As shown in FIG. 2 in phantom the option of utilising solenoid valves at 53 and 54 is shown and these valves can be timed to operate in equivalent fashion to the slide valves 22 and 23. A computerised controller 55 can be used for this purpose. In the illustrated embodiment the controller 55 has inputs from sensors and outputs used to change operating conditions. The sensors include pressure sensors sensing the pressure in tanks 20 and 37, a piston rod frequency and amplitude sensor 56 as well as valve controllers to switch the various valves on and off according to a predetermined control sequence. The control sequence can vary according to the application.

Figure 4:
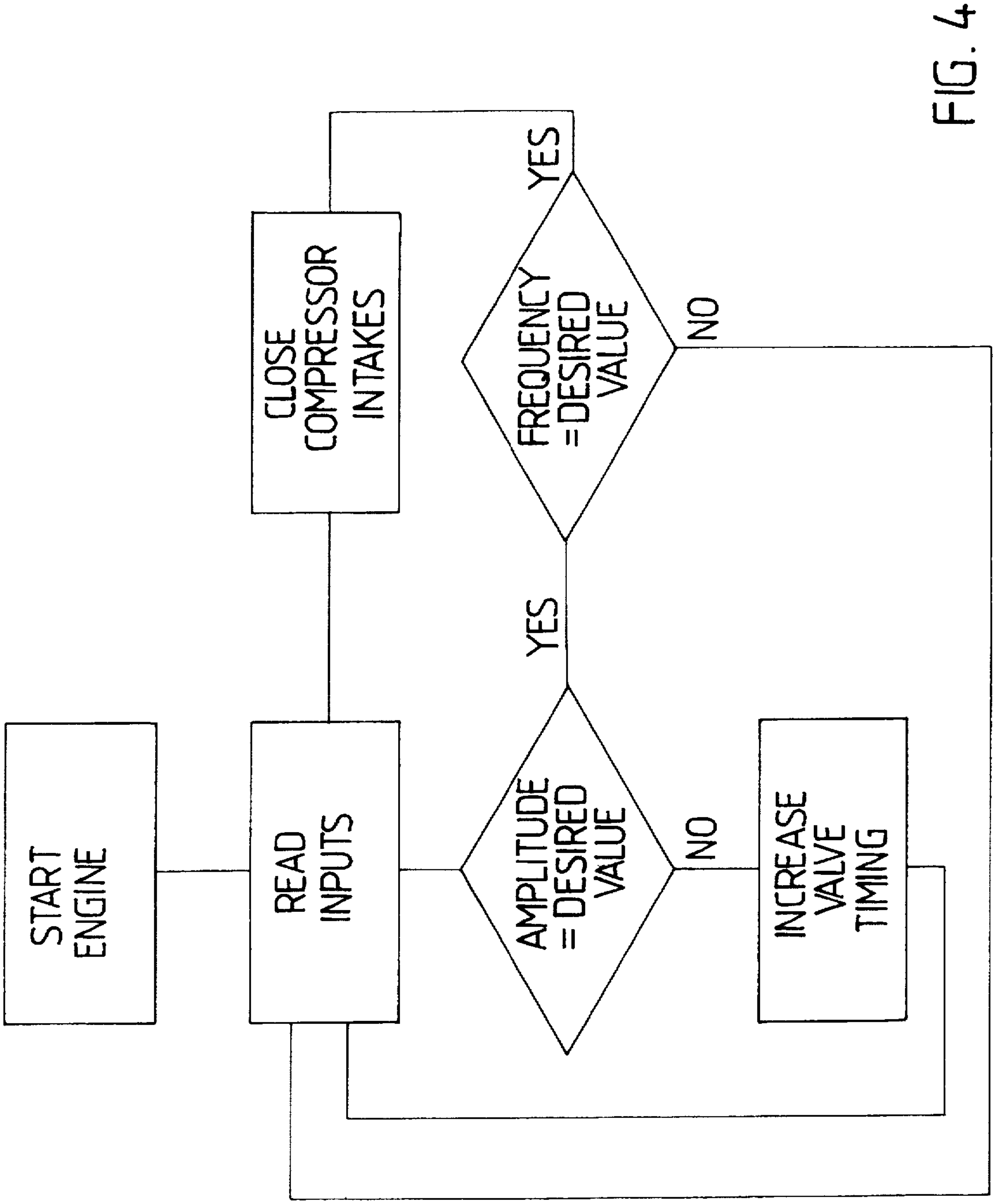
FIG. 4 is a flow chart illustrating a typical control sequence for achieving a steady state frequency and amplitude for a typical oscillator according to the present invention.

Electronic control according to a typical control sequence for a 240 volt AC power supply is illustrated in FIG. 4. The engine is started by firstly using the air actuators to position the piston rod 16 in a start position whereupon the valve 21 is electrically actuated with the solenoid valves 53 and 54 timed or in the case of the valves 22 and 23, the timing is such that a small amplitude of oscillation is initiated. All inputs from the sensors are read and if the amplitude and frequency have reached the desired amplitude and frequency for 50 hertz operation then the system will continue to loop whilst reading inputs. Whenever the system varies from the desired amplitude or frequency then the valve timing or other adjustments will be made. In other words the system automatically moves to the desired frequency upon start up and continues to operate at 50 hertz while generating 240 volts. Compressed air delivered to the tank 20 can be provided by an electric motor driven compressor driven directly from the mains power supply so that the present invention illustrated in FIG. 3 is used as a power supply conditioner for a computer.

Figure 5:
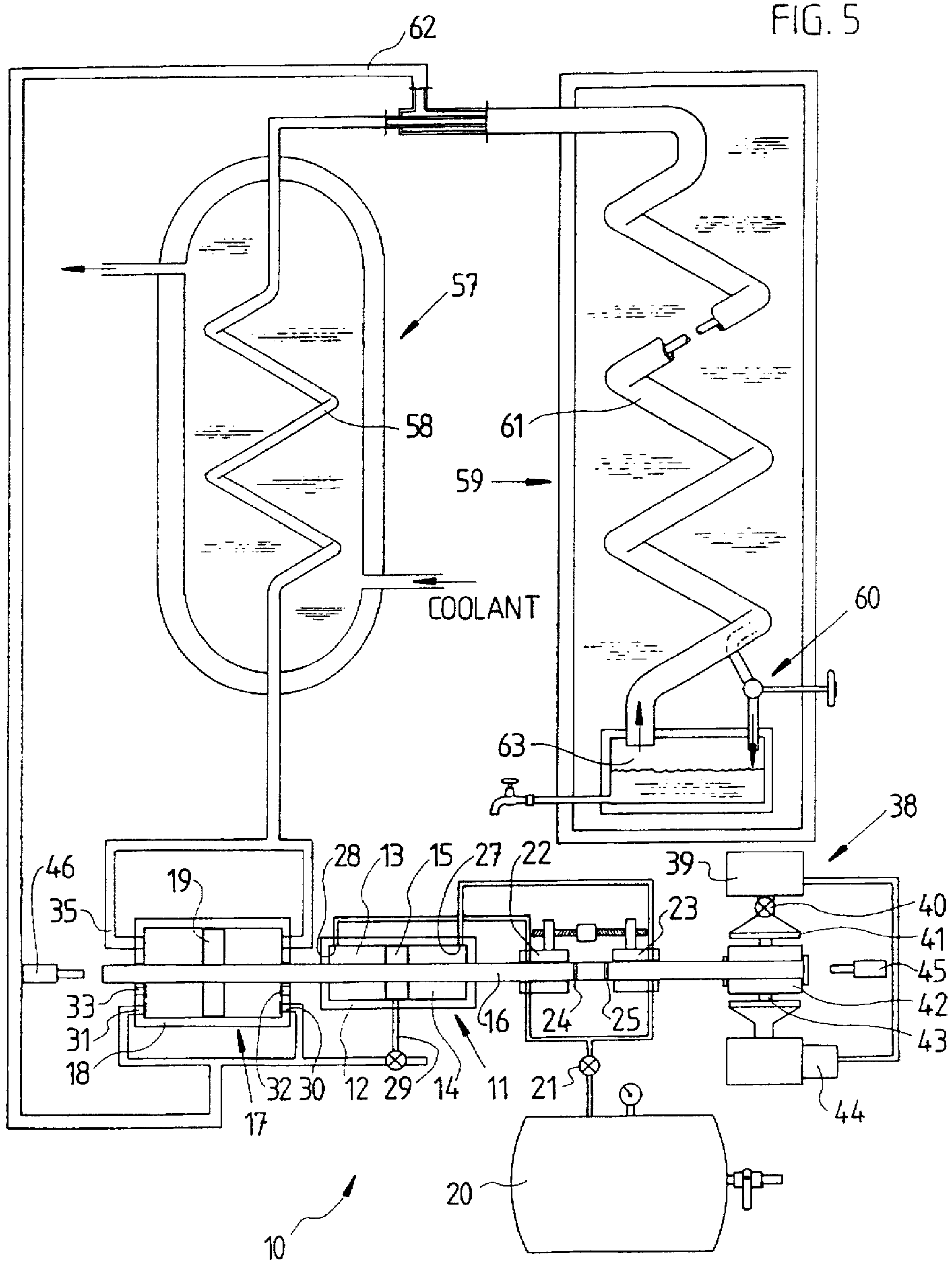
FIG. 5 is a schematic drawing illustrating application of the present invention to an air liquification plant.

Referring now to FIG. 5 there is illustrated another application of the present invention to a air liquification plant. As can be seen in section a compressor driven by an oscillator according to the present invention is used to deliver relatively hot compressed air to a heat exchanger 57 where the air flows through a copper coil 58 and then the relatively cool air flows to an inner tube of a co-axial tube heat exchanger 59 then to an expansion valve 60. After expansion the return air flows in a countercurrent air-to-air heat exchange relation so that as the system is pumped the air recycled along tube 61 through return line 62 and then back through the system gradually cools until the air liquefies at the expansion valve 60. The liquid air is then stored inside the storage tank 63.

The present invention has been illustrated in a number of specific application but can be employed in general application to any oscillating system where it is desirable to utilise expansion of air within expansion chambers to cause oscillation of an oscillating member to perform work.

Although the invention as illustrated in the preceding drawings as being driven by compressed air it can of course be driven in other ways. For example the engine 11 can be an internal combustion engine with each expansion chamber having a fuel injector so that at the same time as the pulse of air is injected under pressure into the expansion chamber a pulse of fuel is also injected and shortly thereafter a spark plug would be fired. In another embodiment the invention can operate as a diesel engine and again utilising the injection of compressed air for that purpose. In each case the engine operating in this form eliminates the need for an induction stroke typical of a two stroke engine.

Whilst the above has been given by way of illustrative example of the present invention, many variations and modifications thereto will be apparent to those skilled in the art without departing from the broad ambit and scope of the invention as set forth in the appended claims.

I claim:

1. A method for converting the energy of an expanding gas into mechanical work comprising the steps of:

(i) applying a sequence of pulses of gas under a positive pressure to complementary expansion chambers of a variable amplitude mechanical oscillator to cause an oscillating member thereof to oscillate in order for the expanding gas to perform work under load;

(ii) continuing to apply said pulses to said chambers while progressively increasing the amplitude of oscillation of said oscillating member until a desired amplitude is reached;

(iii) continuing to apply said pulses to said chambers while maintaining said desired amplitude; and (iv) progressively increasing an inertia of said oscillating member while continuing to apply said pulses to said chambers.

2. The method according to claim 1 including the further step of using said oscillating member to directly or indirectly drive a compressor to compress gas.

3. The method according to claim 1 where in a further and alternative method step said oscillating member is used to directly or indirectly generate electricity.

4. The method according to claim 1 where in a further and alternative step said oscillating member is directly or indirectly used to liquefy air.

5. A gas driven mechanical oscillator comprising a casing, a plurality of expansion chambers within the casing, an oscillating member including moveable walls of said chambers, the oscillating member being adapted to oscillate in response to complementary expansion of gas within the exhaustion of gas from the chambers, and control means operable to vary an amplitude of said oscillating member from an initial low amplitude to a higher amplitude, said control means comprising variable inertia means for increasing the inertia of said oscillating member during oscillation thereof.

6. An oscillator according to claim 5, further comprising means for delivering gas to said expansion chambers as a sequence of gas pulses, said control means includes valve means to control sequencing of said pulses delivered to the chambers in order to increase the amplitude.

7. An oscillator according to claim 5 wherein the expansion chambers are respective opposed chambers of a double acting pneumatic cylinder assembly having a cylinder and a piston on a piston rod within the cylinder, the oscillating member including said piston and being provided with a reciprocable load mounted externally of said cylinder assembly, said piston and said load being mounted for movement in concert, said piston rod having spaced transverse slots and axially shiftable and positionable valve means moveable along said piston rod, said valve means having passage means communicating with a source of compressed gas and at the same time with said chambers, said slots being alternately aligned with the respective spaced passage means in said valve means to supply pulses of gas to the expansion chambers of the double acting pneumatic cylinder assembly to cause the oscillating member to oscillate.

* * * * *